United States Patent [19]

Keitel

[11] 4,340,070
[45] Jul. 20, 1982

[54] ROLL-HOLDING MEANS FOR A CORN-HUSKING BED

[76] Inventor: John Keitel, R.R. #1, Lyons, Ind. 47443

[21] Appl. No.: 281,057

[22] Filed: Jul. 7, 1981

[51] Int. Cl.³ .............................................. A01F 11/06
[52] U.S. Cl. .................................... 130/5 D; 56/105; 130/5 J; 130/5 G
[58] Field of Search ............. 130/5 R, 5 B, 5 C, 5 D, 130/5 E, 5 F, 5 G, 5 H, 5 J, 5 K, 4; 56/104, 105

[56] References Cited

U.S. PATENT DOCUMENTS

| | | | |
|---|---|---|---|
| 1,641,436 | 9/1927 | Jett | 130/5 H |
| 2,413,279 | 12/1946 | Aasland | 130/5 H |
| 2,675,808 | 4/1954 | Hechtman | 130/5 J |
| 2,856,149 | 6/1956 | Garriot | 130/5 R |
| 3,592,200 | 7/1971 | Fedderly | 130/5 J |

Primary Examiner—Robert A. Hafer
Attorney, Agent, or Firm—Norman B. Rainer

[57] ABSTRACT

Apparatus comprised of an elongated horizontally disposed baseplate and a series of spaced apart bushing-holding yokes mounted thereupon provides support for the lower extremities of the elongated rolls of a corn-husking bed, and permits passage of upright ears of corn which would otherwise impair the operation of the corn-husking bed.

6 Claims, 9 Drawing Figures

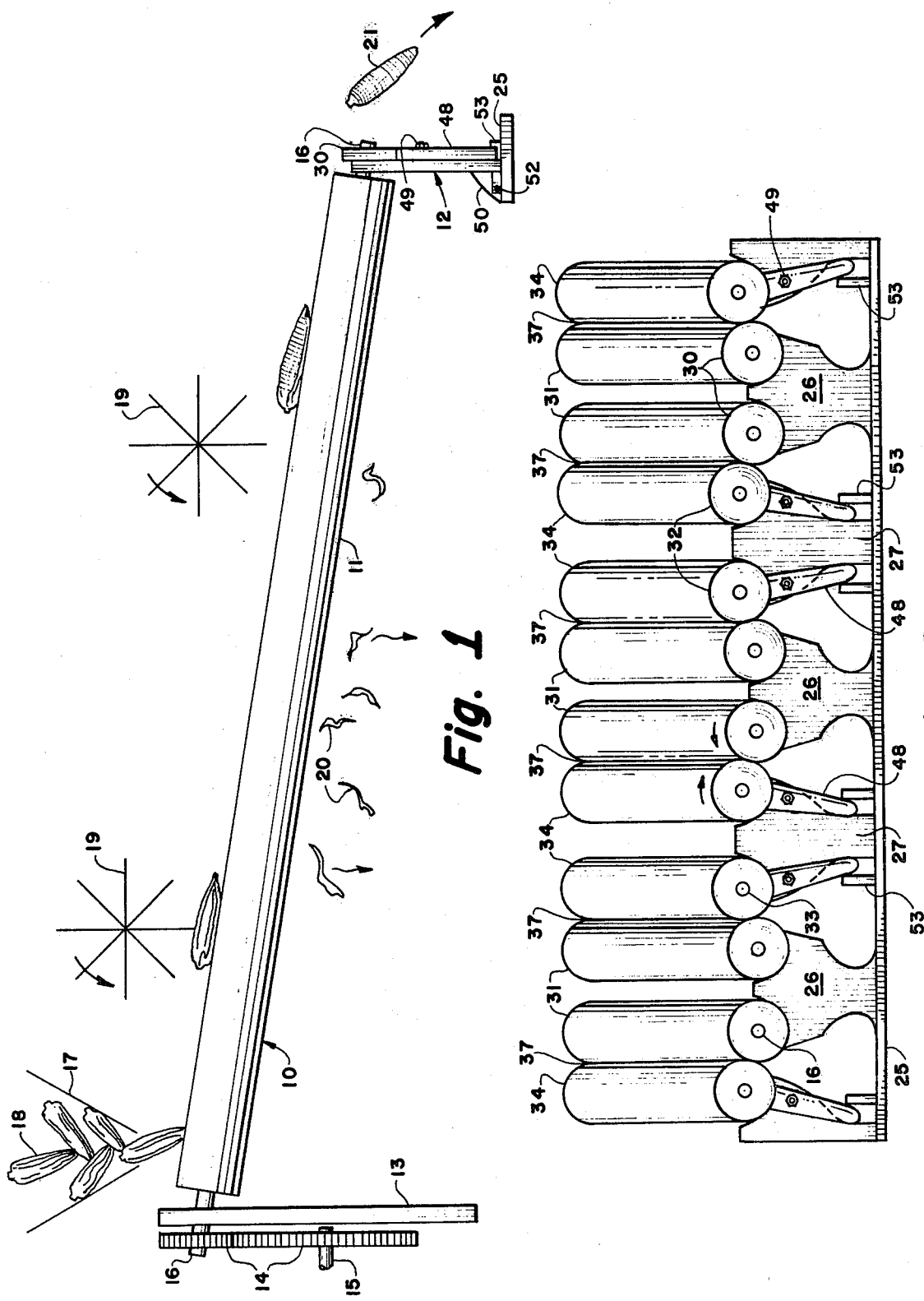

ROLL-HOLDING MEANS FOR A CORN-HUSKING BED

BACKGROUND OF THE INVENTION

This invention relates to an improvement in a corn-husking machine, and more particularly concerns an improved roll-holding device for the lower end of a husking bed of a corn-husking machine.

In the conventional type of corn-husking machine, there is provided a husking bed comprised of a series of parallel pairs of elongated cylindrical husking rolls having forwarding means positioned above the rolls for moving ears of corn axially along the rolls. The rolls are disposed longitudinally in respect to the direction of travel imparted to the corn by said forwarding means. The rolls are also usually inclined so that ears of corn move from an upper end to a lower end of the husking bed.

The husking rolls are provided in pairs wherein one roll, having a resilient surface, is pressed into parallel tangential abutment with a hard-surfaced roll which may be smooth or patterned. Both rolls are rotated in opposite directions such that the surfaces of the rolls, at their nip or contact line, frictionally engage the husk of corn and pull it away from the ear. The husk is pulled downwardly through the nip between the rolls and is deposited below the husking rolls. The husk-free ears of corn remain in the trough-like space between adjacent rolls and travel axially along the rolls and downwardly to a receiving area or processing unit.

The axles of the rolls, at the upper extremities thereof, extend through circular bearing means such as bushings or ball bearing braces in an upper supporting wall member disposed substantially normally to the rolls. Behind said wall, drive means in the form of gears, pulleys and the like, effect rotative motion of the rolls. An end plate is generally positioned substantially normally to the rolls at their downward extremities. The function of the end plate is generally two-fold, namely to provide properly spaced and aligned bearing means which support the downward extremities of the axles of the rolls, and to provide tensioning means which cause each pair of hard and soft surfaced rolls to be in tight abutment throughout their lengths.

In their normal traversal of the husking bed, the ears which have had their husks removed travel in the trough-like space between the rolls downwardly toward said end plate, and thence over said end plate and into a receiving area. On occasion, however, an ear of corn will get caught in an upright position normal to the rolls, a position wherein the ear has begun to pass between the rolls as in the mode of passage of the husks, but remains relatively stationary in said upright position. In the usual operation of husking beds of the prior art, the upright ear may eventually migrate downwardly along the rolls until it comes to resting abutment with the end plate. In said resting position, it prevents passage of subsequent ears along the trough-like space between the rolls. The occurrence of upright or jamming ears is more prevalent when the husking apparatus is used on freshly picked corn having a high moisture content.

When a jamming ear is encountered, motion of the husking bed must be stopped to permit the jamming ear to be cut or broken away. On occasion, the end plate must be removed to enable separation of the rolls which engage the jamming ear, thereby permitting its removal. Such operations are extremely time consuming, and thereby reduce the hourly productivity of the corn-husking equipment.

It is accordingly an object of the present invention to provide an improved husking bed wherein the occurrence of upright ears of corn will not require stoppage of operation of the husking bed.

It is a still further object of this invention to provide improved roll-holding means for the lowermost extremity of a husking bed, whereby upright ears are automatically discharged from said bed.

These objects and other objects and advantages of the invention will be apparent from the following description.

SUMMARY OF THE INVENTION

The above and other beneficial objects and advantages are accomplished in accordance with the present invention by improved roll-holding means adapted for use at the lowermost extremity of the husking bed of a corn-husking machine, said roll-holding means being comprised of an elongated rigid baseplate and a number of spaced apart yokes held by said baseplate and extending thereabove. The yokes are of two types, disposed in alternating relationship, both types having a center plane of symmetry perpendicular to said baseplate. The first type of yoke is provided with two fixed circular bearing means such as bushings, the centers of which are equally spaced about said plane of symmetry and on a line parallel to said baseplate. The second type of yoke is provided with two moveable circular bearing means such as bushings, the centers of which are equally spaced about said plane of symmetry and on a line parallel to said baseplate.

Said moveable bushings are provided with levers which extend toward said baseplate, being attached to said yoke by pivot means such as a bolt or pin. The distal extremity of each lever, namely the extremity on the opposite side of said pivot means from said bushing, engages adjustable tensioning means associated with said yoke.

The circular peripheries of all the bushings, both of the fixed and moveable variety, are centered substantially in a single plane preferably perpendicular to said baseplate. Movement of said moveable bushings is within said plane in a mode permitting contact with or close approach to the fixed bushings of the next adjacent yoke.

In a preferred embodiment, the line defined by the centers of the moveable bushings is spaced further from said baseplate than the line defined by the centers of the fixed bushings.

The spacing between the yokes on said baseplate, the configuration of the yokes, and the distance of separation of said bushings from said baseplate are such as to permit an upright ear of corn engaged by the rolls to pass between the yokes.

BRIEF DESCRIPTION OF THE DRAWING

For a fuller understanding of the nature and objects of the invention, reference should be had to the following detailed description taken in connection with the accompanying drawing forming a part of this specification and in which numerals of reference indicate corresponding parts in all the figures of the drawing:

FIG. 1 is a schematic side view of a husking bed of the present invention.

FIG. 2 is a front view of the husking bed of FIG. 1.

DETAILED DESCRIPTION OF THE PREFERRED EMBODIMENT

Figure 3:
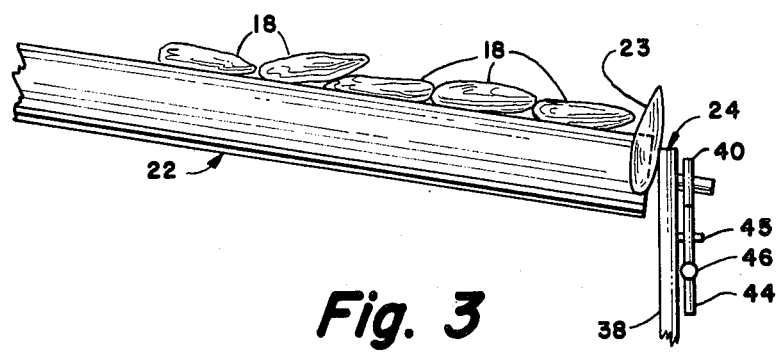
FIG. 3 is a schematic partial side view of a husking bed of the prior art.

Referring to FIG. 1, a husking bed 10 is shown comprised of downwardly sloped rolls 11 engaged at their lowermost extremities by roll-holding means 12 of the present invention and engaged at their uppermost extremities by wall member 13. Interengaging gears 14 positioned behind wall member 13 transfer driving motion from a drive shaft 15 to the axles 16 of said rolls. A hopper 17 disposed above the husking bed adjacent the uppermost extremity thereof controllably feeds unhusked ears of corn 18 to said rolls. Advancing means in the form of rotatably driven finger wheels 19 positioned above said rolls guide and propel the ears in their downward passage. Corn husks 20 removed from the ears of corn fall below said rolls. Husked corn 21 passes over the top of roll-holding means 12 and falls into a receiving area, not shown.

FIG. 3 illustrates the nature of the problem encountered with husking beds 22 of the prior art. Specifically, a jamming ear of corn 23 is shown in upright position and in abutment with roll-holding means 24. Such condition essentially prevents passage of subsequent ears of corn along the husking bed.

Figure 5:
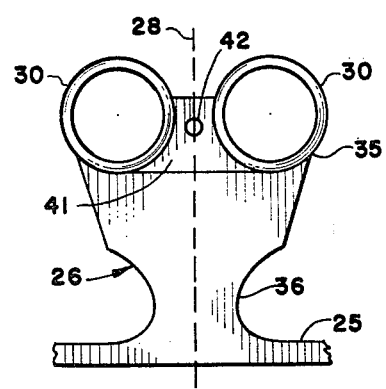
FIG. 5 is an enlarged front view of a first type of yoke of the husking bed of FIG. 2.
Figure 6:
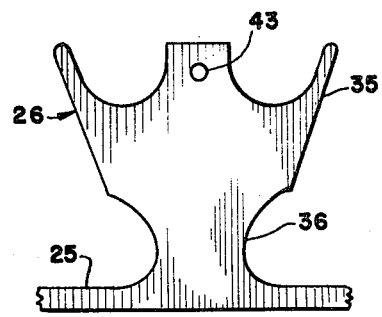
FIG. 6 is a rear view of the yoke of FIG. 5 with the bushings removed therefrom.
Figure 7:
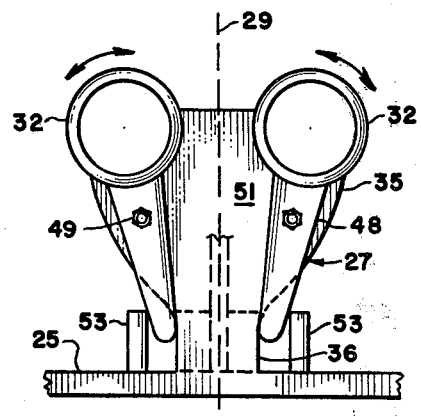
FIG. 7 is an enlarged front view of a second type of yoke of the husking bed of FIG. 2.

The roll-holding means 12 of the present invention is shown in FIG. 2 to be comprised of a rigid baseplate 25 and yokes 26 and 27 extending upwardly from said baseplate. The yokes are of two different types, disposed in alternating relationship and having center planes of symmetry 28 and 29 perpendicular to said baseplate, as indicated in FIGS. 5 and 7. The yokes are further characterized in having an upper portion 35 furthest removed from baseplate 25, and a lower portion 36 of narrower width than said upper portion. The first type of yoke, designated by numeral 26, carries in its upper portion 35 two fixed circular bushings 30 which engage axles 16 of hard-surfaced rolls 31. The second type of yoke, designated by numeral 27, carries in its upper portion 35 two moveable circular bushings 32 which engage axles 33 of soft-surfaced rolls 34. The yokes may be provided with bases which anchor to baseplate 25, or the yokes may be integral continuations of said baseplate. Bushings 30 and 32 may be disposed in a non-vertical plane in order to accommodate inclined axles 16 and 33.

It is to be noted that the manner of positioning of the several rolls by roll-holding means 12 is such that adjacent hard- and soft-surfaced rolls are in contact along nip lines 37, and said rolls rotate in opposite directions, as shown by the arrows in FIG. 2. By virtue of the shape of said yokes and their spacing upon baseplate 25, spaces exist beneath nip lines 37 which permit passage through roll-holding means 12 of those ears of corn which are held in upright position because of partial insertion through nip lines 37.

Figure 4:
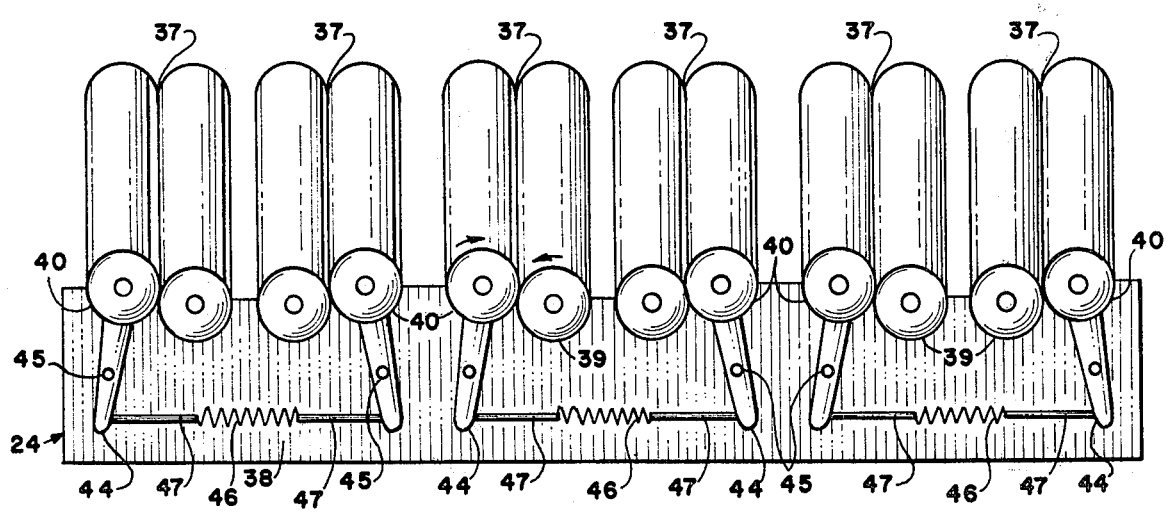
FIG. 4 is a front view of the husking bed of FIG. 3.

By way of comparison, the roll-holding means 24 of the prior art, as shown in FIG. 4, is comprised of a continuous plate 38 which supports stationary bushings 39 and moveable bushings 40 held by levers 44 attached by pivot pins 45 to said plate. Compressed coil springs 46 and associated push rods 47 interact with the extremities of levers 44 below pivot pins 45 to urge the moveable bushings toward the stationary bushings. Plate 38 does not provide a space beneath nip lines 37 which would permit passage of upright ears of corn. Even if such a space did exist, passage of an ear would be prevented by push rods 47.

In the embodiment of yoke 26 illustrated in FIG. 5, bushings 30 are part of a single monolithic structure having a flat bridging portion 41 containing an aperture 42. The bushings are attached to upper portion 35 of yoke 26 by a bolt, not shown, which penetrates aperture 42 and cooperatively positioned aperture 43 in the upper portion of yoke 26. In other embodiments of yoke 26, the bushings may be an integral part of the yoke. For example, materials having the low friction and wear-resistant properties desirable in bushings may be utilized to mold an integral yoke and bushing structure. Such materials may for example include plastics such as nylon, polyacetal, and phenolic resins, and metal alloys commonly utilized for bushings. The particular advantages of the embodiment of yoke of FIG. 5 include replaceability of the bushings which are the most wear-prone components of the roll-holding means, and presents the possibility of fabricating the yoke as an integral extension of baseplate 25.

Figure 8:
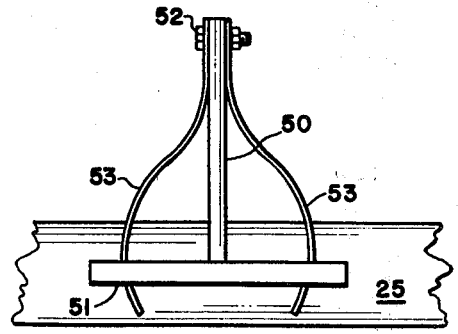
FIG. 8 is a top view of the yoke of FIG. 7 with the bearing means and associated levers removed.
Figure 9:
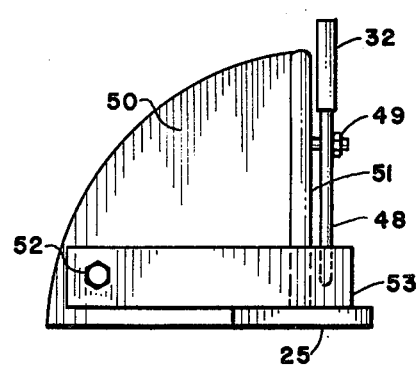
FIG. 9 is a side view of the yoke of FIG. 7.

In the embodiment of yoke 27 exemplified in FIGS. 7, 8 and 9, opposed moveable bushings 32 are associated with the upper extremities of levers 48, attached by pivot pins 49 to the upper portion 35 of the front face 51 of said yoke. A rearward extension 50 associated with the rear face of said yoke adjacent baseplate 25 has opposed flat springs 53 attached thereto by means of bolt 52. Said flat springs are contoured in a manner to extend to front face 51 and compressively engage the lower extremities of levers 48. It is to be noted that the levers are spaced apart beyond the width of lower portion 36 of said yoke. Were it not for such dimensional criticality, springs 53 could not readily reach from behind said yoke to engage said levers. The tension of springs 53 acting upon said levers may be controlled by adjustably tightening bolt 52. With proper tension adjustment, resilient rolls 34, carried by moveable bushings 32, are brought into contact with adjacent hard rolls 31 held by fixed bushings 30.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. In a corn-husking bed comprised of a number of parallel sloped elongated rolls, some of which are in tangential abutment, and means associated with the uppermost extremities of said rolls for supporting said rolls by their axles and causing rotation thereof, improved roll-holding means adapted for use at the lowermost extremities of said rolls comprising:

(a) an elongated rigid base,
(b) a number of spaced apart yokes extending upwardly from said base, said yokes being of a first type and second type disposed in alternating relationship, both types having a center plane of symmetry perpendicular to said base,
(c) said first type of yoke being provided with two fixed circular bearing means, the centers of which are equally spaced about said plane of symmetry and define a line parallel to said base,
(d) said second type of yoke having two moveable circular bearing means, the centers of which are equally spaced about said plane of symmetry and define a line parallel to said base,
(e) a lever pendantly associated with each moveable bearing means and attached by pivot means to said yoke,
(f) adjustable tensioning means associated with each yoke of said second type and adapted to engage said levers below said pivot means,
(g) whereby said moveable bearing means are urged toward said fixed bearing means, and the spaces between said yokes are capable of permitting passage therethrough of an ear of corn which may be in an upright position with respect to said rolls.

2. The improved roll-holding means of claim 1 wherein said base is a horizontally disposed plate.

3. The improved roll-holding means of claim 1 wherein said yokes extend substantially vertically upward from said base.

4. The improved roll-holding means of claim 1 wherein the adjustable tensioning means associated with each yoke of said second type is comprised of a pair of opposed flat springs associated with said yoke.

5. The improved roll-holding means of claim 1 wherein each yoke has an upper portion furthest removed from said base, and a lower portion of narrower width than said upper portion.

6. The improved roll-holding means of claim 1 wherein the levers pendantly associated with each moveable bearing means are positioned laterally beyond the width of the lower portion of said yoke.

* * * * *